UNITED STATES PATENT OFFICE.

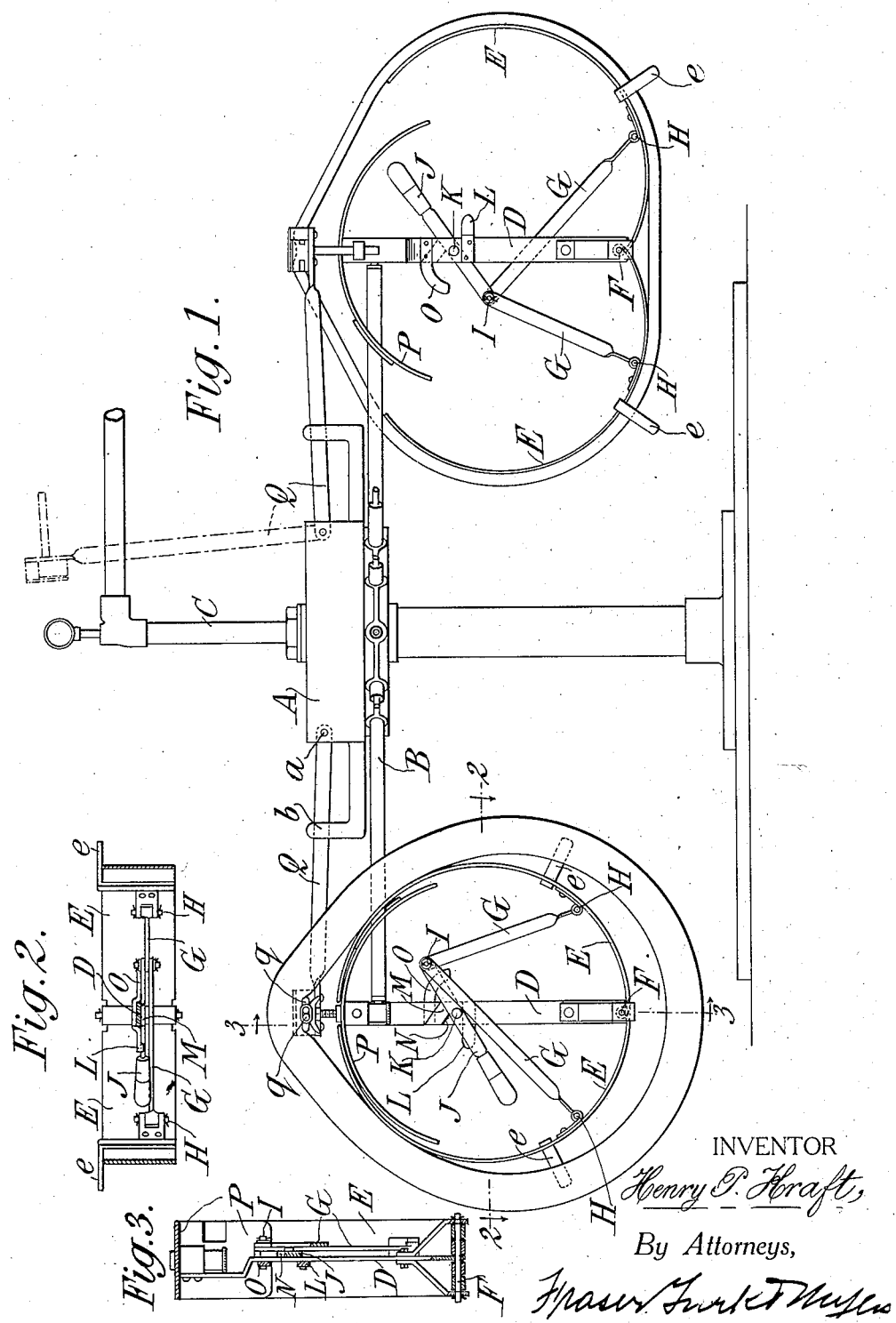

HENRY P. KRAFT, OF RIDGEWOOD, NEW JERSEY, ASSIGNOR TO A. SCHRADER'S SON, INCORPORATED, OF BROOKLYN, NEW YORK, A CORPORATION OF NEW YORK.

TIRE-DEFLATING MACHINE.

1,405,230.  Specification of Letters Patent.  Patented Jan. 31, 1922.

Application filed October 14, 1918, Serial No. 258,078. Renewed July 2, 1921. Serial No. 482,191.

*To all whom it may concern:*

Be it known that I, HENRY P. KRAFT, a citizen of the United States of America, residing in Ridgewood, in the county of Bergen and State of New Jersey, have invented certain new and useful Improvements in Tire-Deflating Machines, of which the following is a specification.

This invention relates to a tire deflating machine, and has for its primary object to provide mechanism for quickly withdrawing air from a pneumatic tire, and maintaining it in proper position during such operation.

In the manufacture of a pneumatic tire or tube, it is difficult to expel all of the fluid contents after manufacture and inspection, and preparatory to marketing, because of its flexible nature and tendency to twist and buckle, and one of the objects of this improvement is to support the tire in such a manner as to accomplish this in a practicable and thorough manner.

An additional object of the invention is to provide a simple mechanism characterized by few parts, and lending itself readily to the rapid handling of a large number of tires.

The invention comprises a supporting device which engages the inner periphery of a tire so as to cause the walls to collapse and also prevent twisting of the tire. At the same time, provision is made for opening the tire valve, the mechanism being preferably applied in conjunction with suction means for drawing air from the interior of the tire. One form of the mechanism includes a plurality of members pivotally mounted upon a carrier, and adapted to be expanded by dropping downwardly and outwardly from gravity, against the inner periphery of a surrounding pneumatic tube.

A further important part of the invention lies in providing adequate, simple mechanism for maintaining the walls of the tire sufficiently spaced at the valve to prevent closing the outlet opening by the opposite wall of the tire.

To these and other ends the invention consists in certain other details and combinations of parts as will be hereinafter more fully described and pointed out in the claims at the end of the specification.

Figure 1 is a side elevation, showing the application of one form of the invention to a suction-operating deflating machine;

Fig. 2 is a horizontal sectional view on line 2—2 of Fig. 1, and

Fig. 3 is a sectional view on line 3—3 of Fig. 1.

The invention is in the nature of an improvement of the construction embodied in application Serial No. 208,336, filed December 21, 1917, and is shown applied to a mechanism of the same general type as the aforesaid application. A designates a central holder which is rotatively mounted and carries a series of tire supports in the form of tubes B. The latter are connected through the holder A with a common suction pipe C, and at their outer ends carry suitable provision for receiving a tire and automatically opening the valve therein, similarly to the application already mentioned.

The tube or support B is provided with an additional support for the tire, preferably in the form of expansible means adapted to be forced against the inner periphery. In the illustrated embodiment, the tube B is provided with a carrier or upright D, and pivoted to the lower end of the latter is a plurality of outwardly movable supporting members or arms E. These are preferably pivoted at the common point F, and adapted to fall by gravity to their outermost or expanded position, as shown at the right of Fig. 1, to expand the tire. The arms E carry guards $e$ which limit sidewise movement of the tire and prevent its twisting. The supporting members or arms E need not necessarily be pivoted as shown, since other arrangements may be utilized, permitting of an outward or expansive action against the inner periphery of the tire to engage the latter and hold it in position. The means just described forms a substantial holder for the tire, in addition to the support which co-operates with its valve to hold it open, and while the latter action takes place, the expansible support acts to partially force the air from the interior through the open valve. This, of course, is only supplemental to the work of the suction means previously mentioned.

Means are also provided for manually operating the supporting members E and for holding them in their extreme positions, and to accomplish this, the levers G are provided, pivoted to the arms E at H, and pivoted to each other at I. J designates a control lever which is pivoted to the carrier at K, and pivotally connected with the links G at the point I. The lever J, together with the expansible arms E, is held in its normal or contracted position by means of a spring latch L engaging over the upper edge of the lever. By forcing the latter upwardly, against the pressure of the latch L, the parts are disengaged and the weight of the arms E is sufficient to move them by gravity to the expanded position shown at the right of Fig. 1, the normal or contracted position being illustrated at the left of said figure. Stops M and N are provided which limit movement of the lever J in opposite directions, while O is a spring finger fixedly attached to the carrier D and arranged to abut against the side of the lever J and steady the parts, to prevent undue chatter or looseness, when the parts are contracted, as at the left of Fig. 1. The arms E are preferably of such length as to extend over the frame P to the center of the latter, when contracted, so that when they are expanded, a substantial part of the tire is thereby engaged.

A suitable spreading device is provided, in order to separate the walls of the tire at the point of the valve, and is supported upon the central holder, so that it can be thrown back above the latter when not in use. Preferably, each spreading device includes a rod or bar Q pivoted at $a$ upon the holder A, and provided at its outer end with spreader arms $q$, which co-operate with the tire on opposite sides of the valve stem. $b$ designated a guide and stop member for directing the downward movement of the bar Q. The operative position of the support is shown in full lines, while the dotted lines of Fig. 1 indicate its position when out of operation and thrown upwardly above the central holder A.

While the invention is described herein with reference to a more or less particular embodiment, it is not limited to the specific form shown or described, since it may be modified in various ways without departing from the spirit and underlying novelty of the improvement, or the scope of the following claims.

I claim as my invention:—

1. A pneumatic tire deflating mechanism consisting of an expansible support on which a tire can be mounted, the support being arranged inside the tire and expansible against the inner periphery to hold the tire during deflation and having a recess to receive a tire valve.

2. A pneumatic tire deflating mechanism consisting of a support on which a tire can be mounted, and expansible means adapted to be moved against the inner periphery of the tire to hold the tire during deflation, and means for holding the tire valve open during deflation.

3. A pneumatic tire deflating mechanism consisting of expansible means embodying a carrier, and a plurality of members movable outwardly with reference to the carrier into engagement with the inner periphery of a tire to hold the tire during deflation, and means for holding the tire valve open during deflation.

4. A pneumatic tire deflating mechanism consisting of expansible means embodying a carrier and a plurality of supporting members therein adapted to engage the inner periphery of a tire, said members, when in normal position, supporting the tire uncollapsed and actuated outwardly by gravity, when released, to hold the tire during deflation.

5. A pneumatic tire deflating mechanism consisting of expansible means embodying a carrier and a plurality of supporting arms pivoted at the bottom of the carrier and actuated outwardly by gravity against the inner periphery of a tire to hold it during deflation, and means acting to hold the arms in their innermost contracted position.

6. A pneumatic tire deflating mechanism consisting of a rotary holder, a series of tire supports on the holder, and common suction means communicating with each tire support and adapted to co-operate with a tire valve, each tire support including expansible means embodying a plurality of supporting members adapted when expanded to engage the inner periphery of a tire to cause its collapse.

7. A pneumatic tire deflating mechanism according to claim 6, in which said supporting members are pivoted at the bottom of a carrier, and actuated outwardly by gravity.

8. A pneumatic tire deflating mechanism consisting of a central rotary holder, a series of supports in the holder, each adapted to receive a tire, and spreading devices pivoted on the central holder and co-operating with the tires on the supports.

9. A pneumatic tire deflating mechanism consisting of a central rotary holder, a series of supports on the holder, each adapted to receive a pneumatic tire, a series of rods pivoted on the central holder, and spreader arms mounted at the outer end of each rod for co-operation with a tire on the corresponding support.

10. A pneumatic tire deflating mechanism consisting of a rotary series of tire supports, and tire spreading devices pivoted independently of said supports and movable into and out of co-operative relationship with tires on the supports.

11. A pneumatic tire deflating mechanism consisting of expansible means embodying a carrier and a plurality of supporting arms pivoted at the bottom of the carrier and actuated outwardly by gravity against the inner periphery of a tire, links pivoted to the arms, a control lever pivoted to said links and to the carrier, stops for limiting the movement of the lever in opposite directions, and a latch co-operating with the lever and acting to hold the parts in contracted relationship.

In witness whereof, I have hereunto signed my name.

HENRY P. KRAFT.